(12) United States Patent
Lake

(10) Patent No.: US 6,648,281 B1
(45) Date of Patent: Nov. 18, 2003

(54) PORTABLE SPILL CONTAINMENT BRIDGE AND HOSE AND CABLE SUPPORT SYSTEM

(75) Inventor: John W. Lake, Bakersfield, CA (US)

(73) Assignee: Western Oilfields Supply Co., Bakersfield, CA (US)

( * ) Notice: Subject to any disclaimer, the term of this patent is extended or adjusted under 35 U.S.C. 154(b) by 0 days.

(21) Appl. No.: 10/080,858

(22) Filed: Feb. 22, 2002

(51) Int. Cl.⁷ .................. A62C 13/76; A62C 37/50; B05B 15/06
(52) U.S. Cl. .................. 248/75; 248/49; 248/80
(58) Field of Search .................. 248/49, 65, 83, 248/80, 158, 75, 152, 146; 138/106, 110; 52/677, 684, 689, 685, 686, 687; 285/148.3

(56) References Cited

U.S. PATENT DOCUMENTS

| | | | | |
|---|---|---|---|---|
| 3,788,025 A | * | 1/1974 | Holmes | 52/685 |
| D279,164 S | * | 6/1985 | Mitchell et al. | D8/354 |
| D279,352 S | * | 6/1985 | Mitchell et al. | D8/354 |
| 5,729,949 A | * | 3/1998 | Hartzheim | 52/677 |
| D394,200 S | * | 5/1998 | Hartzheim | D8/354 |
| 6,003,819 A | * | 12/1999 | Hall | 248/49 |
| 6,327,822 B1 | * | 12/2001 | Il Grande | 52/80.1 |

FOREIGN PATENT DOCUMENTS

| | | | |
|---|---|---|---|
| GB | 2139664 | * | 5/1983 |
| GB | 2158848 A | * | 11/1985 |
| JP | 2002/115293 | * | 4/2002 |

* cited by examiner

Primary Examiner—Gwendolyn Baxter
(74) Attorney, Agent, or Firm—Holland & Knight LLP

(57) ABSTRACT

A portable hose bridge for use in spanning a flexible wall of a portable spillage container so as to prevent the hose or other equipment extending from the container from distorting the flexible wall of the container and impairing the environmental integrity of the container. The hose bridge includes a pair of perpendicularly disposed archways, a pair of perpendicularly disposed and differently sized saddles disposed above and extending parallel to the archways and four support legs bordering the archways for securely supporting and positioning the bridge such that one of the archways extends along and over a portion of the spillage container wall and one of the saddles extends perpendicular to and above the wall for carrying a hose or other equipment over the wall.

7 Claims, 4 Drawing Sheets

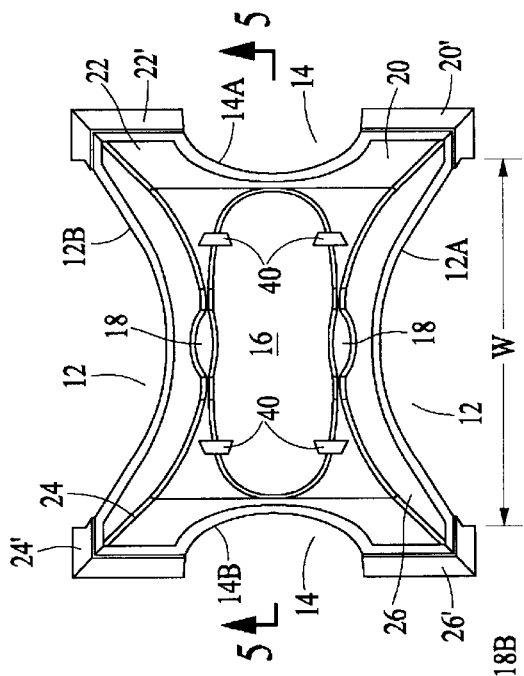
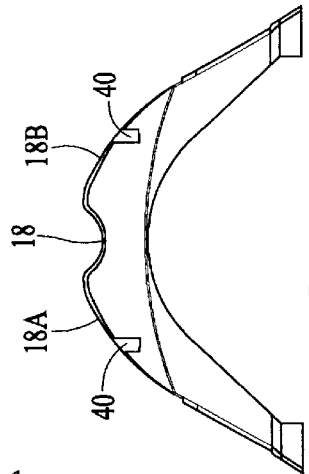
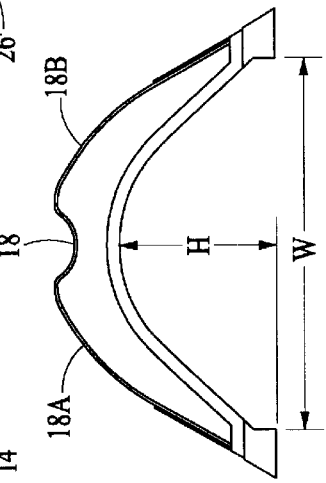
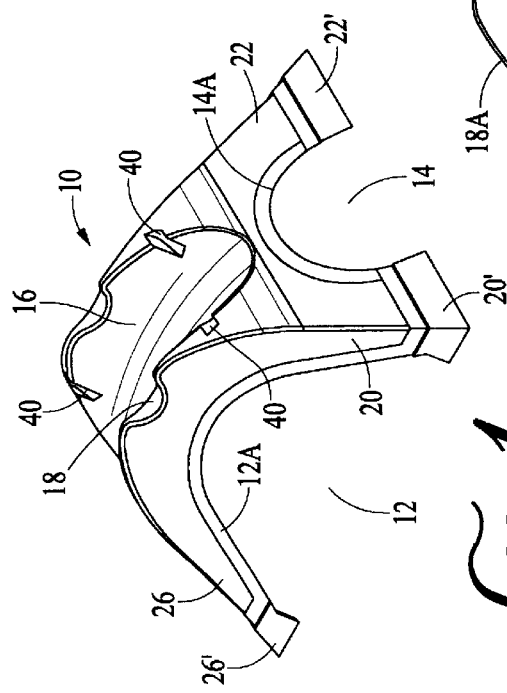
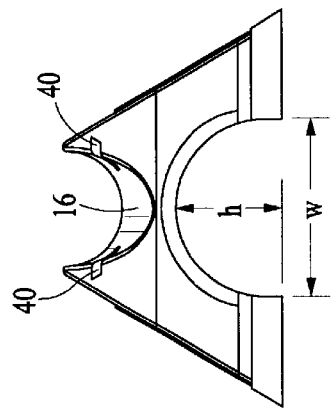

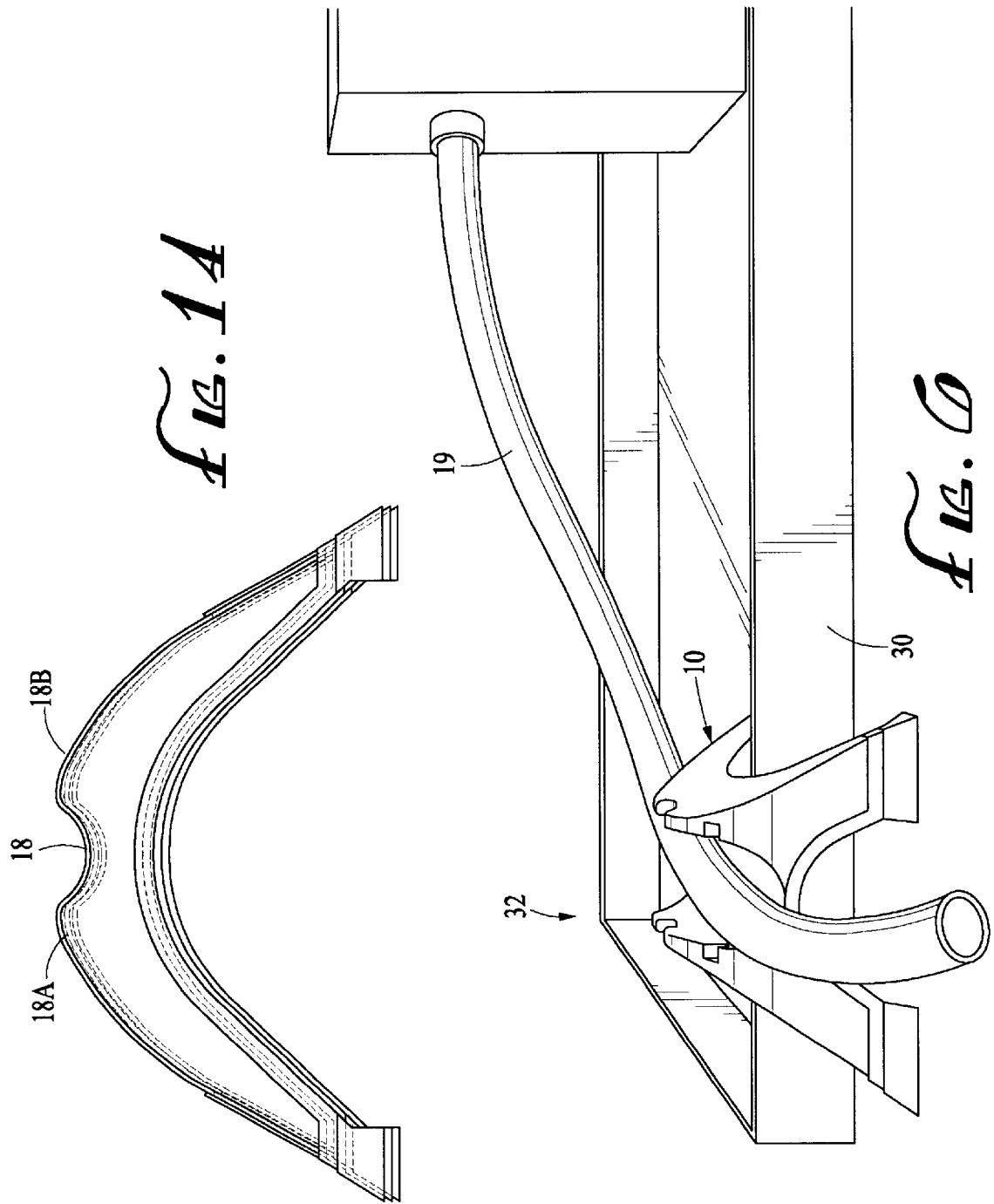

PORTABLE SPILL CONTAINMENT BRIDGE AND HOSE AND CABLE SUPPORT SYSTEM

BACKGROUND OF THE INVENTION

Portable spillage containers, also known as portable berms, are commonly used under tanks, pumps, boxes and other portable equipment to capture leaking liquids or solids and contain the leakage to protect the environment from contamination. These portable spillage containers typically comprise a flooring and upstanding perimeter wall and are constructed of a lightweight flexible material so that they can be easily transported and deployed. The equipment typically disposed within the walls of these containers often have hoses, cables and pipes extending therefrom to locations or other equipment located outside the walls of the spillage container. When these hoses or other connections pass over the flexible wall of the container, they may cause the wall to collapse and compromise the integrity of the container by providing an escape path for the contained material. It would therefore be desirable to provide a bridge for spanning the flexible wall of the spillage container that could carry the various hoses, cables and pipes over the container wall to preserve the integrity of the spillage container. Such a device should be light in weight so as to be readily portable, be able to fit in tight areas, yet be very stable so that the bridge is not easily upset or overturned by the movement of the hose or other equipment carried thereby during use. The bridge also should be configured to accommodate hoses, cables, pipes and any other equipment of different sizes and to prevent such equipment from being readily dislodged from the bridge during use and falling onto the containment wall.

The present invention provides such a bridge.

In addition to spanning spillage containment walls and providing the above-described portability, stability and versatility, it also would be desirable if such a bridge could be configured such that it could cooperate with one or more other such bridges and with one or more lateral extensions to provide a versatile and lightweight elevated temporary system for supporting hoses, cable and pipe over varying paths and distances above the ground. Such a system could keep hose, cable and pipe elevated above wet ground surfaces. It could eliminate abrasion and chemical damage to hoses by keeping high pressure hoses out of water and chemicals as, for example, during hydro-blasting. It also could be used to provide a versatile elevated hose support to eliminate acute bending in the hose in those applications involving elevated connections (e.g. elevated water tank) where the weight of the hose can put an undue loading stress on the hose connections and can cause kinking in the hose. The present invention also provides such a support system.

SUMMARY OF THE INVENTION

Briefly, the present invention comprises a portable hose bridge for use in spanning the wall of a portable spillage container so as to prevent hoses and other equipment extending from the containers from collapsing or distorting the wall of the containers and compromising the environmental integrity of the containers. The hose bridge of the present invention is of a durable, light weight, and single piece construction, preferably rectangular in configuration and defines a pair of perpendicularly disposed archways for spanning the wall in two different orientations, a pair of perpendicularly disposed and preferably differently sized saddles disposed above and extending parallel to the archways for carrying one or more hoses or other equipment over the wall, and four support legs bordering the archways for securely supporting and positioning the bridge such that one of the archways extends along and over a portion of the spillage container wall, orienting one of the saddles perpendicular to and above the container wall. So positioned, the saddle can receive and support one or more hoses, cables, pipes or other connections and direct those connections over the container wall without distorting the wall and adversely affecting the integrity of the spillage container. By providing the bridge with a rectangular configuration and differently sized saddles, a larger saddle can be disposed over the container wall in a highly stable position for most applications to best support and secure the particular hose or other connection or connections to be extended from the container over the container wall, thereby minimizing the chance of the bridge being overturned on the hose or other items thereon being inadvertently pulled from the saddle during use and collapsing the container wall. However, for applications in which space adjacent the container wall is very limited, the bridge can be rotated ninety degrees such that the shorter side of the bridge spans the wall and the second saddle spans the container wall to support the hose and/or other equipment.

In certain applications, it is necessary to support more hoses and/or other equipment from the spillage container area over the container wall that then can be securely carried by the larger of the two saddles formed by the bridge. Accordingly, the bridge is preferably provided with a plurality of support surfaces proximate one of the saddles therein that are adapted to receive correspondingly configured surfaces on an equipment support tray whereby the tray can be securely carried by a pair of the hose bridges so as to provide a larger elevated support over the container wall or an extended elevated support in applications where it is desirable to maintain equipment above the ground.

It is the principal object of the present invention to provide a durable lightweight bridge for supporting hoses, piping and cables over the flexible wall of a portable spillage container without distorting the wall and adversely affecting the integrity of the container.

It is another object of the present invention to provide such a bridge which is particularly adapted to securely support hoses, piping and cables of different sizes so as to reduce the likelihood of a hose or other connection or connections being carried thereby from being dislodged from the bridge during use and falling onto the container wall.

It is yet another object of the present invention to provide such a bridge that is that occupies minimal space during use yet is very stable as hoses or other equipment are moved thereon.

It is a further object of the present invention to provide such a bridge which is of simple construction, chemically resistant and economical to manufacture.

It is yet another object of the present invention to provide a highly portable device for supporting hoses and cables in an elevated position where the weight of the hose and/or cable would otherwise cause excessive loading on the hose and/or cable connections and/or acute bending in the hose and/or cable sufficient to damage the hose and/or cable.

It is still another object of the present invention to provide such a bridge which is adaptable for use with one or more such bridges and lateral extensions to provide a highly versatile and lightweight elevated temporary support for use in a wide variety of applications wherein it is desirable to raise the hose, pipe and/or cable or other equipment carried thereby off the ground and support the elevated hose, pipe and/or cable over varying paths and distances.

It is a still further object of the present invention to provide such a bridge which is configured to nest with other such bridges to reduce the cost of storage and shipping.

These and other objects and advantages of the present invention will become readily apparent from the following detailed description taken in conjunction with the accompanying drawings.

BRIEF DESCRIPTION OF THE DRAWINGS

FIG. 1 is a perspective view of the preferred embodiment of the hose bridge of the present invention.

FIG. 2 is a top plan view of the preferred embodiment of the hose bridge of the present invention.

FIG. 3 is a side view of the preferred embodiment of the hose bridge of the present invention.

FIG. 4 is an end view of the preferred embodiment of the hose bridge of the present invention.

FIG. 5 is a sectional view taken along the line 5—5 of FIG. 2.

FIG. 6 is a perspective view of the hose bridge of the present invention in use carrying a large discharge hose over a spillage container wall.

FIG. 14 is a side view of a plurality of nested hose bridges.

DETAILED DESCRIPTION OF THE PREFERRED EMBODIMENTS

Figure 7:
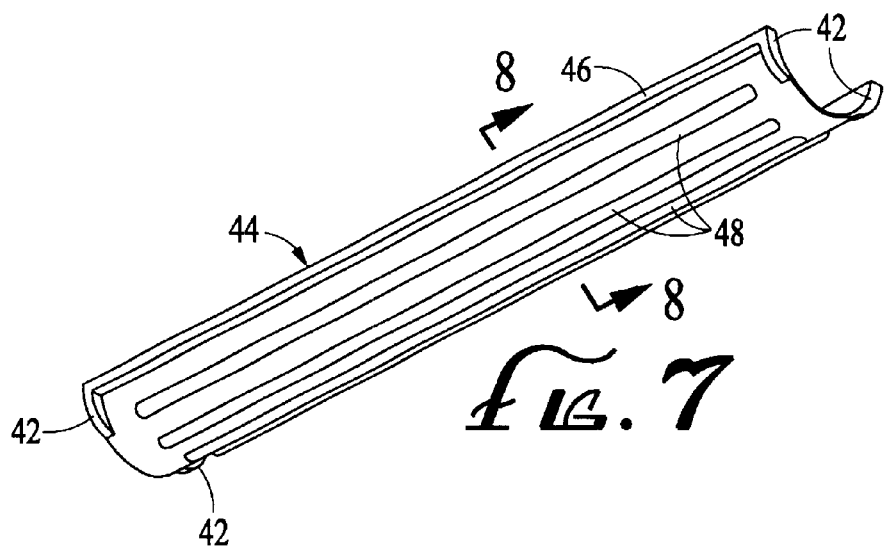
FIG. 7 is a perspective view of a hose/cable support tray used with the bridge of the present invention.

Referring now in detail to the drawings, the preferred embodiment of the hose bridge 10 of the present invention is illustrated in FIGS. 1–6. Bridge 10 is preferably constructed of either high density, low density or crosslink polyethylene resin so as to render the bridge durable, light in weight and chemical resistant. The bridge 10 defines a first archway 12, a second archway 14, a first primary saddle 16, a second saddle 18 and four support legs 20–26. The first archway 12 is defined by aligned arches 12A and 12B and is perpendicularly disposed with respect to the second archway 14 formed by aligned arches 14A and 14B. Arches 12A and 12B each define a vertical height H and a transverse opening W greater than the height h and opening w defined by arches 14A and 14B. While the exact dimensions of the archways are not critical, in one example of bridge 10, H=17 17/32 in., W=42 3/32 in., h equals 12 in. and w equals 20 7/32 in. The primary saddle 16 has an arcuate contour defined by a segment of a constant radius circle 13½ in. in diameter. The second smaller saddle 18 is formed by and disposed between curvilinear surfaces 18A and 18B and has an arcuate contour defined by a segment of a constant radius circle of about 8⅝ in. in diameter. Thus, the primary saddle 16 is relatively deep and extends substantially the major length of the bridge to provide excellent support and securement for a single hose 19 up to twelve inches in diameter or one or more smaller hoses, cables, pipes or other equipment. Saddle 18 is configured to support hoses up to about six to eight inches in diameter. To provide bridge 10 with a highly stable platform, the support legs 20–26 are all inclined outwardly in two dimensions and terminate at their lower ends in feet 20'–26', each foot defining a footprint of about 5¾ in. by about 12½ inches.

In use, the portable bridge 10 is preferably positioned over a portion of the upstanding wall 30 of a portable spillage container 32 such that the arches 12A and 12B span wall 30 as seen in FIG. 6. As the height H of the arches and the elevation of the bottom of saddle 16 are sufficient to clear a conventional spillage container wall 30, typically about twelve in. high, the bridge 10 and hose 19 or other object or objects carried by the bridge will clear the container wall without distorting the wall and adversely impacting the integrity of the spillage container 32. In this position, the bridge is oriented such that the larger primary saddle 16 is disposed perpendicularly to the container wall 30 to provide excellent nesting and support of the hose 19 in the bridge 10. The height H of the arches 12A and 12B are sufficient to provide adequate wall clearance and a highly stable platform is provided due to wide footprint provided by the rectangular configuration of the bridge, the outwardly inclined legs 20–26 and the relatively large support feet 20'–26': In applications where minimal space is available to accommodate the bridge 10 adjacent the container wall, the bridge could be rotated such that arches 14A and 14B span the container wall 30 so as to shorten the distance the bridge extends beyond the wall, whereupon the smaller saddle 18 would be aligned perpendicular to the wall 30 for carrying a base or other equipment. While saddle 18 is neither as wide or deep as saddle 16, it still provides a nesting support for hoses up to about eight inches in diameter and thus is well suited for a great majority of spillage container applications, whose space is at a premium, thereby significantly increasing the versatility of the bridge 10.

In addition to providing a versatile configuration for carrying hoses and other items of varying sizes over a flexible container wall, the preferred embodiment of bridge 10 allows multiple bridges to be nested or stacked together to reduce shipping and storage costs. This is achieved by tapering the legs 20–26 and the outer surfaces of archways 12 and 14 outwardly and downwardly as best seen in FIGS. 1 and 2. Thus, the exterior surfaces of one of bridges 10 will mate with the interior surfaces thereof move to the desired nesting or stacking.

Figure 8:
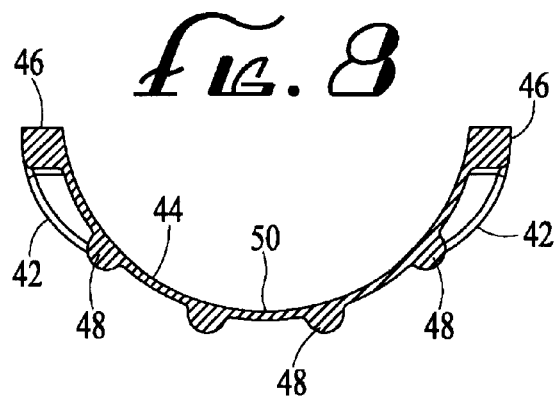
FIG. 8 is a sectional view taken along line 8—8 in FIG. 7.
Figure 9:
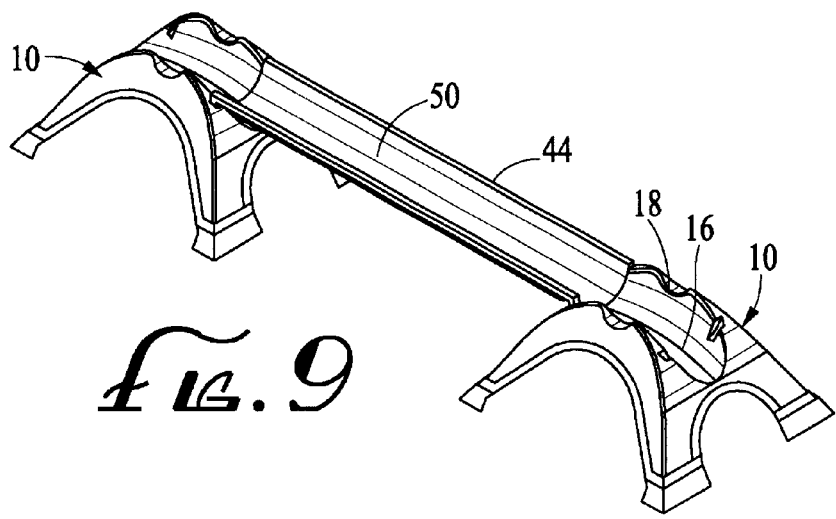
FIG. 9 is a perspective view illustrating the use of a pair of hose bridges of the present invention with a hose/cable support tray.
Figure 10:
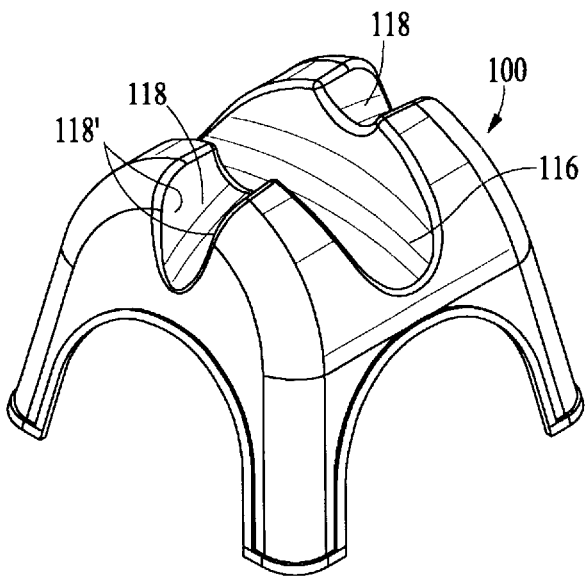
FIG. 10 is a perspective view of a second embodiment of the hose bridge of the present invention.
Figure 11:
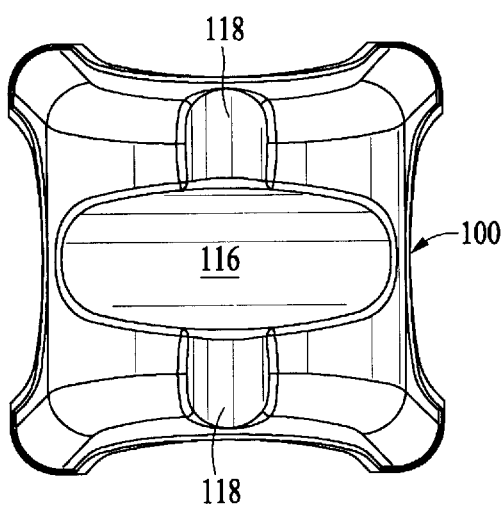
FIG. 11 is a plan view of the second embodiment of the hose bridge of the present invention.
Figure 12:
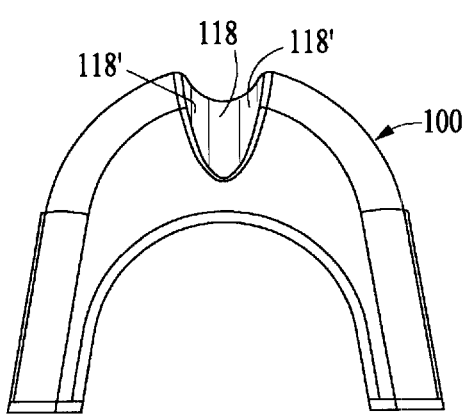
FIG. 12 is a side view of the second embodiment of the hose bridge of the present invention.
Figure 13:
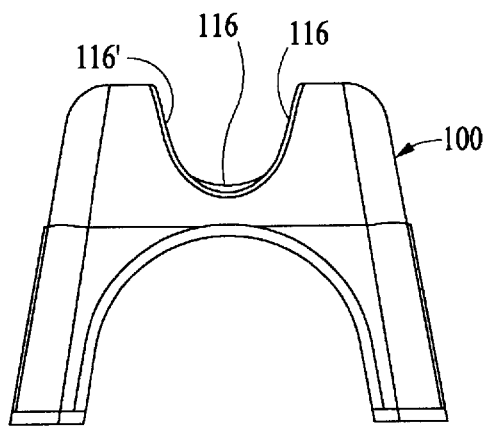
FIG. 13 is an end view of the second embodiment of the hose bridge of the present invention.

The bridge 10 also is preferably provided with a pair of recessed surfaces 40 laterally adjacent each of the end portions of the primary saddle 16 that are adapted to receive correspondingly configured depending ears 42 on a hose/cable tray 44 illustrated in FIGS. 7–9 to provide a highly versatile and portable hose, pipe and cable support system. Two of the bridges 10 can be used in conjunction with the tray 44 to support one or more hoses, cables, pipes or other equipment above the ground over longer distances than can be accomplished with single bridge 10. For example, when it is desirable to keep the hoses, cables, pipes or other equipment off a muddy ground or out of water or chemicals on the ground surface, the hose or other equipment can be extended over a container wall 30 with a single bridge and carried above the ground to a desired location by one or more pairs of bridges 10 carrying support trays 44. Such a support system could, of course, be used to provide an elevated support of desired length and configuration when no containment wall is present. The support tray 44 is preferably concave between a pair of lateral support ridges 46 from which ears 42 depend and is preferably additionally provided with a plurality of equidistantly spaced support ribs 48 disposed between ribs 46 (see FIGS. 7 and 8). It is to be understood that other tray configurations and means of securing the trays 44 to the bridges 10 could be employed. Thus, tray 44 provides a support surface 50 similar in cross-section to saddle 16 to securely support one or more hoses or other items thereon. For certain applications, e.g., a temporary elevated pipe support system, the use of the elongated trays 44 may not be necessary as a plurality of aligned bridges 10 and saddles would provide the necessary support and securement due to the rigidity in the pipe and the shape of the aligned saddles.

An alternate embodiment of the present invention for carrying smaller hoses than bridge 10 is illustrated in FIGS. 10–13. The hose bridge 100 illustrated therein is of a square configuration and includes perpendicularly a disposed saddles 116 and 118. By way of example, saddle 116, has an arcuate contour defined by a segment of a constant radius circle of about 6⅝', terminating in outwardly inclined wall portions 116'. Saddle 118 has an arcuate contour defined by a segment of a constant radius inch of about 4⅝ in., terminating in outwardly inclined wall portions 118'. In one embodiment of hose bridge 100 having these hose saddle sizes, the bridge measures 30 inches on each side and has an archway clearance of about 13 inches. While highly suitable for carrying smaller hoses over a spillage container wall, if the scale of bridge 100 were increased to that of bridge 10 to accommodate larger hoses, the overall elevation of the bridge would be such as to decrease its stability during use. Accordingly, in the preferred embodiment of the invention, the bridge 10 is of a rectangular configuration and employs a secondary saddle 18 of substantially reduced size.

Various changes and modifications may be made in carrying out the present invention. Insofar as these changes and modifications are within the purview of the appended claims, they are to be considered as part of the present invention.

I claim:

1. A portable hose bridge and support(for use in spanning a flexible wall of a portable spillage container so as to prevent a hose or other equipment extending from the container from distorting an upstanding wall of the container, said bridge comprising a pair of perpendicularly disposed archways, a pair of perpendicularly disposed and differently-sized saddles positioned above and extending parallel to said archways and four support legs bordering said archways and terminating in flat support surfaces for securely supporting and positioning the bridge such that one of said archways extends along and over a portion of the spillage container and one of said saddles extends perpendicular to and above the container wall for receiving and supporting the hose or other equipment and directing the hose or equipment over the container wall.

2. The hose bridge of claim 1 wherein said bridge is of single piece construction and each of said support legs is angled downwardly and outwardly with respect to both of said archways to provide a stable support platform for said bridge.

3. The hose bridge of claim 2 wherein said bridge is of a rectangular configuration.

4. The hose bridge of claim 2 wherein said bridge is of a square configuration.

5. The hose bridge of claim 2 wherein said bridge defines an outer contour and an inner contour, said outer contour mating with said inner contour whereby a plurality of said bridges can be stacked together in nesting configuration for storage and shipping.

6. The bridge of claim 1 including lateral support surfaces disposed on opposed sides of the larger of said saddles proximate each of the extended ends of said larger saddle and an equipment support tray, said tray defining a concave equipment support surface and a pair of laterally disposed attachment members depending from opposed sides of said support surface adjacent the extended ends thereof, said attachment members being adapted to mate with one of said pairs of said support surfaces on said bridge whereby said tray can be supported between a pair of said bridges for providing an extended elevated equipment support surface.

7. A portable hose bridge and support system including a pair of bridges, each of said bridges comprising a pair of perpendicularly disposed archways, a pair of perpendicularly disposed and differently-sized saddles positioned above and extending parallel to said archways, four support legs bordering said archways for securely supporting and positioning the bridge and lateral support surfaces disposed on opposed sides of the larger of said saddles proximate extended ends of said larger saddle and an equipment support tray, said tray defining a concave equipment support surface and a pair of laterally disposed attachment members depending from opposite sides of said support surface adjacent the extended ends thereof, said attachment members mating with said support surfaces on said bridge whereby said tray is supported between said bridges for providing an extended elevated equipment support surface.

* * * * *

UNITED STATES PATENT AND TRADEMARK OFFICE
CERTIFICATE OF CORRECTION

PATENT NO. : 6,648,281 B1 Page 1 of 1
DATED : November 18, 2003
INVENTOR(S) : John W. Lake It is certified that error appears in the above-identified patent and that said Letters Patent is hereby corrected as shown below:

Column 5,
Line 26, change the foot mark "'" to the inch mark -- " --
Line 46, removed the parenthesis mark "("

Signed and Sealed this

Twentieth Day of January, 2004

JON W. DUDAS
*Acting Director of the United States Patent and Trademark Office*